US006779296B1

(12) United States Patent
Mosher, II (10) Patent No.: US 6,779,296 B1
(45) Date of Patent: Aug. 24, 2004

(54) MOSQUITO TRAPPING APPARATUS UTILIZING COOLED CARBON DIOXIDE

(75) Inventor: Robert F. Mosher, II, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 0 days.

(21) Appl. No.: 10/360,401

(22) Filed: Feb. 7, 2003

(51) Int. Cl.[7] .................................................. A01M 1/20
(52) U.S. Cl. ........................................................ 43/107
(58) Field of Search ................................... 43/107, 139

(56) References Cited

U.S. PATENT DOCUMENTS

| 449,138 A | 3/1891 | Roth |
| 520,715 A | 5/1894 | Thum et al. |
| 550,345 A | 11/1895 | Humphreys et al. |
| 718,834 A | 1/1903 | Godfrey |
| 834,228 A | 10/1906 | Blanchard |
| 849,323 A | 4/1907 | Blanchard |
| 916,305 A | 3/1909 | Haefele |
| 923,368 A | 6/1909 | Myser |
| 959,155 A | 5/1910 | Nault |
| 1,087,921 A | 2/1914 | Caldwell |
| 1,118,845 A | 11/1914 | Day |
| 1,332,474 A | 3/1920 | Skelly |
| 1,488,178 A | 3/1924 | Thomas et al. |
| 1,502,200 A | 7/1924 | Howlett et al. |
| 1,509,116 A | 9/1924 | Thomas et al. |
| 1,685,241 A | 9/1928 | Northrup |
| 1,693,368 A | 11/1928 | Cherry |
| 2,258,683 A | 10/1941 | Ketterer |
| 2,264,875 A | 12/1941 | Greuling |
| 2,879,620 A | 3/1959 | McGinnis |
| 3,023,539 A | 3/1962 | Emerson, Jr. |
| 3,685,199 A | 8/1972 | Bradshaw |
| 3,708,908 A | 1/1973 | Levey |
| 3,796,001 A | 3/1974 | Jackson |
| 3,913,259 A | 10/1975 | Nishimura et al. |
| 3,931,865 A | 1/1976 | Levitt |
| 3,997,999 A | 12/1976 | Evans |
| 4,117,624 A | 10/1978 | Phillips |
| 4,121,371 A | 10/1978 | Kaphengst et al. |

(List continued on next page.)

FOREIGN PATENT DOCUMENTS

| DE | 38 40 440 A1 | 10/1989 |
| JP | 10229801 | 2/1998 |
| WO | WO 89/12389 | 12/1989 |
| WO | WO 99/15007 | 4/1999 |

OTHER PUBLICATIONS

Anonymous, "Taking Back Neighborhoods One Yard at a Time: Mosquito Magnet Assembly and Operating Manual," *American Bioysics Corp.*, pp. 1–11 (Oct. 26, 2000).

(List continued on next page.)

*Primary Examiner*—Charles T. Jordan
*Assistant Examiner*—Jordan Lofdahl
(74) *Attorney, Agent, or Firm*—Leydig, Voit & Mayer, Ltd.

(57) ABSTRACT

An insect trap that utilizes a combustion chamber to produce carbon dioxide for an attractant. Combustion gasses from the combustion chamber are cooled in a conduit for the trap inlet. Thus, a single fan may be used for both drawing insects into the insect trap and for cooling the combustion chamber. Combustion gasses, after being cooled by the flow of air through the conduit connected to the trap inlet, may be further cooled by a cooling system, such as a thermoelectric device. As such, the insect trap of the present invention may be used to produce carbon dioxide, via combustion, at temperatures at or below ambient temperature.

20 Claims, 4 Drawing Sheets

U.S. PATENT DOCUMENTS

| | | |
|---|---|---|
| 4,168,591 A | 9/1979 | Shaw |
| 4,182,069 A | 1/1980 | De Yoreo |
| 4,366,643 A | 1/1983 | Boaz |
| 4,387,529 A | 6/1983 | Hedstrom |
| 4,411,094 A | 10/1983 | Spackova et al. |
| 4,438,584 A | 3/1984 | Baker et al. |
| 4,490,937 A | 1/1985 | Yavnieli |
| 4,519,776 A | 5/1985 | DeYoreo et al. |
| 4,523,404 A | 6/1985 | DeYoreo |
| 4,603,505 A | 8/1986 | Millard |
| 4,625,453 A | 12/1986 | Smith |
| 4,785,573 A | 11/1988 | Millard |
| 4,819,370 A | 4/1989 | Woodruff |
| 4,907,366 A | 3/1990 | Balfour |
| 4,962,611 A | 10/1990 | Millard |
| 5,040,326 A | 8/1991 | Van Dijnsen et al. |
| 5,048,224 A | 9/1991 | Frisch |
| 5,136,802 A | 8/1992 | Chen |
| 5,142,815 A | 9/1992 | Birdsong |
| 5,203,816 A | 4/1993 | Townsend |
| 5,205,064 A | 4/1993 | Nolen |
| 5,205,065 A | 4/1993 | Wilson et al. |
| 5,231,790 A | 8/1993 | Dryden et al. |
| 5,241,779 A | 9/1993 | Lee |
| 5,255,468 A | 10/1993 | Cheshire, Jr. |
| 5,272,831 A | 12/1993 | Willis |
| 5,301,458 A | 4/1994 | Deyoreo et al. |
| 5,329,725 A | 7/1994 | Bible |
| 5,369,909 A | 12/1994 | Murphy |
| 5,382,422 A | 1/1995 | Dieguez et al. |
| 5,417,009 A * | 5/1995 | Butler et al. ............... 43/113 |
| 5,577,342 A | 11/1996 | Johnson et al. |
| 5,588,250 A | 12/1996 | Chiba et al. |
| 5,595,018 A | 1/1997 | Wilbanks |
| 5,608,988 A | 3/1997 | Dowling et al. |
| 5,647,164 A * | 7/1997 | Yates ........................ 43/139 |
| 5,651,211 A | 7/1997 | Regan et al. |
| 5,657,576 A | 8/1997 | Nicosia |
| 5,669,176 A * | 9/1997 | Miller ........................ 43/139 |
| 5,713,153 A | 2/1998 | Cook et al. |
| 5,722,199 A | 3/1998 | Demarest et al. |
| 5,799,436 A * | 9/1998 | Nolen et al. ............... 43/112 |
| 5,813,166 A | 9/1998 | Wigton et al. |
| 5,896,695 A | 4/1999 | Walker |
| 5,915,948 A | 6/1999 | Kunze et al. |
| 5,930,944 A | 8/1999 | Knuppel |
| 5,943,815 A | 8/1999 | Paganessi et al. |
| 5,950,353 A | 9/1999 | Johnson et al. |
| 5,950,355 A | 9/1999 | Gilbert |
| 5,983,557 A | 11/1999 | Perich et al. |
| 6,032,406 A * | 3/2000 | Howse et al. ............... 43/114 |
| 6,033,212 A | 3/2000 | Bonnema et al. |
| 6,050,025 A | 4/2000 | Wilbanks |
| 6,055,766 A * | 5/2000 | Nolen et al. ............... 43/112 |
| 6,088,949 A | 7/2000 | Nicosia et al. |
| 6,108,965 A | 8/2000 | Burrows et al. |
| 6,134,826 A | 10/2000 | Mah |
| 6,145,243 A * | 11/2000 | Wigton et al. ............... 43/139 |
| 6,161,327 A | 12/2000 | Thomas |
| 6,195,932 B1 | 3/2001 | Aicher |
| 6,199,316 B1 | 3/2001 | Coventry |
| 6,209,256 B1 | 4/2001 | Brittin et al. |
| 6,267,953 B1 | 7/2001 | Bernier et al. |
| 6,286,249 B1 * | 9/2001 | Miller et al. ............... 43/139 |
| 6,293,044 B1 | 9/2001 | Feng |
| 6,305,122 B1 * | 10/2001 | Iwao et al. ............... 43/112 |
| 6,442,889 B1 | 9/2002 | Lee |
| 6,508,032 B2 * | 1/2003 | Lin ............................ 43/107 |
| 6,594,944 B2 * | 7/2003 | Chura ........................ 43/98 |
| 6,594,946 B2 * | 7/2003 | Nolen et al. ............... 43/114 |
| 6,618,984 B1 * | 9/2003 | Li ............................... 43/112 |
| 6,655,078 B2 * | 12/2003 | Winner et al. ............... 43/114 |
| 6,655,080 B2 * | 12/2003 | Spiro et al. ............... 43/139 |
| 2001/0045051 A1 | 11/2001 | Miller et al. |
| 2002/0011020 A1 * | 1/2002 | Nelson et al. ............... 43/107 |
| 2002/0129539 A1 * | 9/2002 | Brunet ........................ 43/112 |
| 2002/0129540 A1 * | 9/2002 | Chura ........................ 43/112 |
| 2003/0005619 A1 * | 1/2003 | Lin et al. ............... 43/122 |
| 2003/0051391 A1 * | 3/2003 | Jablin ........................ 43/139 |
| 2003/0084604 A1 * | 5/2003 | Durand et al. ............... 43/139 |
| 2003/0154645 A1 * | 8/2003 | Spiro et al. ............... 43/139 |
| 2003/0208951 A1 * | 11/2003 | Bossler ........................ 43/107 |

OTHER PUBLICATIONS

Burgess, L., "Probing Behavior of Aedes aegypti (L.) in Response to Heat and Moisture", *Nature*, vol. 184, pp. 1968, 1969, Dec. 19, 1959.

Cariaga, Vance, "Propane Demand Lights up Business Here", *Investors Business Daily*, http://www.investors.com/editorial/newamer.asp?view=1 printed Sep. 19, 2002.

Davis et al. "Sensory Physiological Basis for Attraction in Mosquitoes", *Journal of American Mosquito Control Association*, vol. 10, No. 2, pp. 316–325, 1994.

Daykin et al., "Host Finding and Repulsion of Aedes aegypti", *The Canadian Entomologist*, vol. 9, pp. 239–263, Mar. 1965.

Daykin, P.N., "Orientation of Aedes aegypti in Vertical Air Currents", *The Canadian Entomologist*, vol. 99, pp. 303–308, Mar. 1967.

Daykin et al. "A Two–Air–Stream Observation Chamber for Studying Responses of Flying Insects", *The Canadian Entomologist, vol. 97*, pp. 264–268, Mar. 1965.

Gatehouse, A.G., "The probing Response of Stomoxys Calcitrans to Certain Physical and Olfactory Stimuli" *Journal of Insect Physiology*, vol. 16, pp. 61–74, 1970.

Granett et al. "Testing Tick Repellents and Observations of Phototropic Effects" *Journal of Economic Entomology*, vol. 40, No. 2, pp. 259–263, Apr. 1947.

Hoskins et al. "The Olfactory Response of Flies in a New Type of Insect Olfactometer", *Journal of Economic Entomology*, vol. 28, pp. 1029–1036, Oct. 1934.

Hoy, James B., "Trapping the Stable Fly by Using CO2 or Co as Attractants", *Journal of Economic Entomology*, vol. 63, No. 3, pp. 793–795, Jun. 1970.

Kellogg et al. "The Guidance of Flying Insects V. Mosquito Attraction", *The Canadian Entomologist, vol. 94, No. 10*, pp. 1009–1016, Oct. 1962.

Khan et al. "A Study of the Probing Response of Aedes aegypti: Effect of Dry and Moist Heat on PRobing", *Journal of Economic Entomology*, vol. 64, No. 2, pp. 442–443, Apr. 1971.

Khan et al. "Quantitation of Effect of Several Stimuli on the Approach of Aedes aegypti", *Journal of Economic Entomology*, vol. 59, No. 3, pp. 690–694, Jun. 1966.

Kline, Daniel L., "Comparison of the Two American Biophysics Mosquito Traps: The Professional and a New Conterflow Geometry Trap", *Journal of American Mosquito Control Association, vol. 15, No. 3*, pp. 276–282, Sep. 1999.

Kline, Daniel L., "Field Evaluation of Heat as an Added Attractant to Traps Baited with Carbon Dioxide and Octnol for Aedes Taeniorhynchus", *Journal of American Mosquito Control Association, vol. 11, No. 4*, pp. 454–456, Dec. 1995.

Reeves, W. C., "Quantitative Field Studies on a Carbon Dioxide Chemotropism of Mosquitoes", pp. 325–331.

Roachell Walter, "Olfactory Cues in Mosquito Host Location", *Insect Behavior Review Articles 1997*. http://www.colocstate.edu/Depts/Entomology/courses/en507/papers_1997/roachell.html printed Oct. 7, 2002.

Roitberg et al., "Host Response Profiles: A New Theroy to help us understand Why and How Attractants Attract", *Journal of American Mosquito Control Association, vol. 10, No. 2*, pp. 333–338, Jun. 1994.

Sutcliffe, James F., "Sensory Basis of Attractancy: Morphology of Mosquito Olfactory Sensilla–A Review", *Journal of American Mosquito Control Association, vol. 10, No. 2*, pp. 309–315, Jun. 1994.

Van Dyk, John, "Mosquito Host–Seeking: A Partial Review", http://www.ent.iastate.edu/dept/research/vandyk/hostseek.html, pp. 1–20 printed Oct. 3, 2002.

Willis, Edwin R., "The Olfactory Response of Female Mosquitoes", *Journal of Economic Entomology*, vol. 40, No. 6, pp. 769–778, Dec. 1947.

Wright R. H., "The Olfactory Guidance of Flying Insects", *The Canadian Entomologist*, pp. 81–89, Feb. 1958.

Wright et al., "Responses of Aedes aegypti to Moist Convection Currents", *Nature*, vol. 194, No. 4826, 1 page, Apr. 28, 1962.

* cited by examiner

MOSQUITO TRAPPING APPARATUS UTILIZING COOLED CARBON DIOXIDE

TECHNICAL FIELD OF THE INVENTION

The present invention relates to insect traps, and more particularly to devices for attracting, and trapping or killing, mosquitoes and other biting insects.

BACKGROUND OF THE INVENTION

Biting insects, such as mosquitoes and flies, can be an annoying, serious problem in man's domain. They interfere with work and spoil hours of leisure time. Their attacks on farm animals can cause loss of weight and decreased milk production. Worldwide, mosquito-borne diseases kill more people than any other single factor. Mosquitoes can be carriers of malaria, yellow fever, and dengue fever in humans. In the United States, mosquitoes spread several types of encephalitis, including the West Nile virus. They also transmit heart worms to cats and dogs.

People are not the primary blood hosts for mosquitoes and biting insects, especially in temperate climates. The major mosquito pests in the southeastern United States seem to prefer the host-odor of small herbivorous (vegetarian) mammals, such as rabbits, or birds. Mosquitoes that carry encephalitis seem to prefer avian (bird) blood hosts. These mosquitoes bite people when they get the chance, but they are better at tracking the scent of animals that are most abundant in their habitat.

People have tried a number of different methods to rid themselves of mosquitoes and other biting insects. One method that is often utilized is spraying or applying chemical insecticides. Although many chemicals work well to kill or repel mosquitoes, the chemicals often have a deleterious effect on the environment, including, but not limited to, killing beneficial insects. In addition, chemical insecticides are effective only for a limited amount of time, and thus must be continuously sprayed. Moreover, many types of mosquitoes and biting insects are capable of developing resistance to the chemical pesticides in a few generations (which may only take a few months for mosquitoes), and in the long run, that adaptation makes the species stronger.

Another method used to combat mosquitoes is bug zappers. In general, a bug zapper includes a fluorescent light source surrounded by an electrified grid. The theory behind these devices is that the mosquitoes are attracted to the light, and, upon flying to the light, will be electrocuted by the grid. In actuality, however, the bug zappers kill beneficial insects, and attract mosquitoes but does not kill them in significant numbers.

Citronella candles and smoking coils are often used to repel mosquitoes and other insects. However, research has shown that, in general, an individual must stand within the smoky plume of the citronella to be protected. This, of course, is not desirable. Moreover, even when standing in the plume, citronella is only partly effective in reducing the probability of a mosquito bite. Encouraging natural predation of insects by setting up bird or bat houses in the backyard has also been unsuccessful in reducing local mosquito populations.

Recently, significant research and effort have been expended to develop devices that attract and trap or kill mosquitoes. In general, these devices attempt to replicate the mosquito-attracting attributes of a typical blood host, such as a rabbit or a bird. Mosquitoes locate blood hosts by scent, sight and heat. From 100 feet away (30 meters) mosquitoes can smell a potential blood host's scent, especially the carbon dioxide ($CO_2$) the blood host exhales. Similarly, biting flies can smell their prey from 300 feet (100 meters) away. Because $CO_2$ is present in the atmosphere (plants take in $CO_2$ and give off oxygen), mosquitoes respond to higher-than-normal concentrations, especially when the $CO_2$ is mixed with host-odor. They follow a blood host's scent upwind, and can see a target at a distance of about 30 feet (10 meters). Devices that try to simulate a mosquito host thus may include, for example, a source of carbon dioxide, a source of octenol (an alcohol that is given off by mammalian blood hosts), and/or a heat source.

One such device is sold under the trademark "MOSQUITO MAGNET" and is described in U.S. Pat. No. 6,145,243 to Wigton et al. The MOSQUITO MAGNET apparatus is an insect trapping device that generates its own insect attractants of carbon dioxide ($CO_2$), heat, and water vapor through catalytic conversion of a hydrocarbon fuel in a combustion chamber. The hot insect attractants generated in the combustion chamber are diluted and cooled to a temperature above ambient temperature and below about 115 degrees Fahrenheit (F) by mixing with air, and the mixture is exhausted downward through an exhaust tube. A counterflow of outside air is drawn into the trap though a suction tube that concentrically surrounds the exhaust tube. Biting insects are sucked into the suction tube and are captured in a porous, disposable bag connected to the other end of the suction tube. Additional chemical attractants may be used with the device to make the trap even more effective.

Although the MOSQUITO MAGNET device works well for its intended purpose, due to its high suggested retail price ($500 to $1300, depending upon the model), it is far out of reach of the ordinary consumer. Thus, few people would actually purchase the MOSQUITO MAGNET, even if they have a pressing need for mosquito control.

Another device that has been used in the past for trapping mosquitoes is the Center for Disease Control (CDC) light trap. The light trap includes a motor driven rotary fan to move attracted insects down into a holding container suspended beneath the trap, and a light source. More recently, the CDC light trap has been used with a source of carbon dioxide, usually dry ice. Dry ice produces carbon dioxide at a temperature below ambient, and works particularly well for attracting mosquitoes and other biting insects. Although a CDC light trap utilizing dry ice works well for its intended purpose, the handling and use of dry ice can be difficult and expensive.

SUMMARY OF THE INVENTION

The present invention provides an insect trap that utilizes a combustion chamber to produce carbon dioxide for an attractant. Combustion gasses from the combustion chamber are cooled in a conduit for the trap inlet. Thus, a single fan may be used for both drawing insects into the insect trap and for cooling the combustion chamber.

In accordance with an aspect of the present invention, combustion gasses, after being cooled by the flow of air through the conduit connected to the trap inlet, may be further cooled by a cooling system, such as a thermoelectric device. As such, the insect trap of the present invention may be used to produce carbon dioxide, via combustion, at temperatures at or below ambient temperature.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "back," and the like, the orientations are to aid the reader in understanding the invention, and are not meant to be limiting.

At the outset, it is important to note a few characteristics of mosquitoes and flying insects. Typically, biting insects are attracted by the odor of kairomones, which are chemicals given off by blood hosts and which are attractants to biting insects. Kairomones include carbon dioxide exhaled by both mammalian and avian blood hosts and octenol, an alcohol which is given off by mammalian blood hosts. Biting insects locate a blood host by tracking the odor plume created by the blood host. A mixture of carbon dioxide and octenol is particularly attractive to insects seeking mammalian blood hosts. The present invention provides a relatively inexpensive way to provide cooled carbon dioxide for a mosquito trap, and specifically may provide carbon dioxide at or below ambient.

Figure 1:
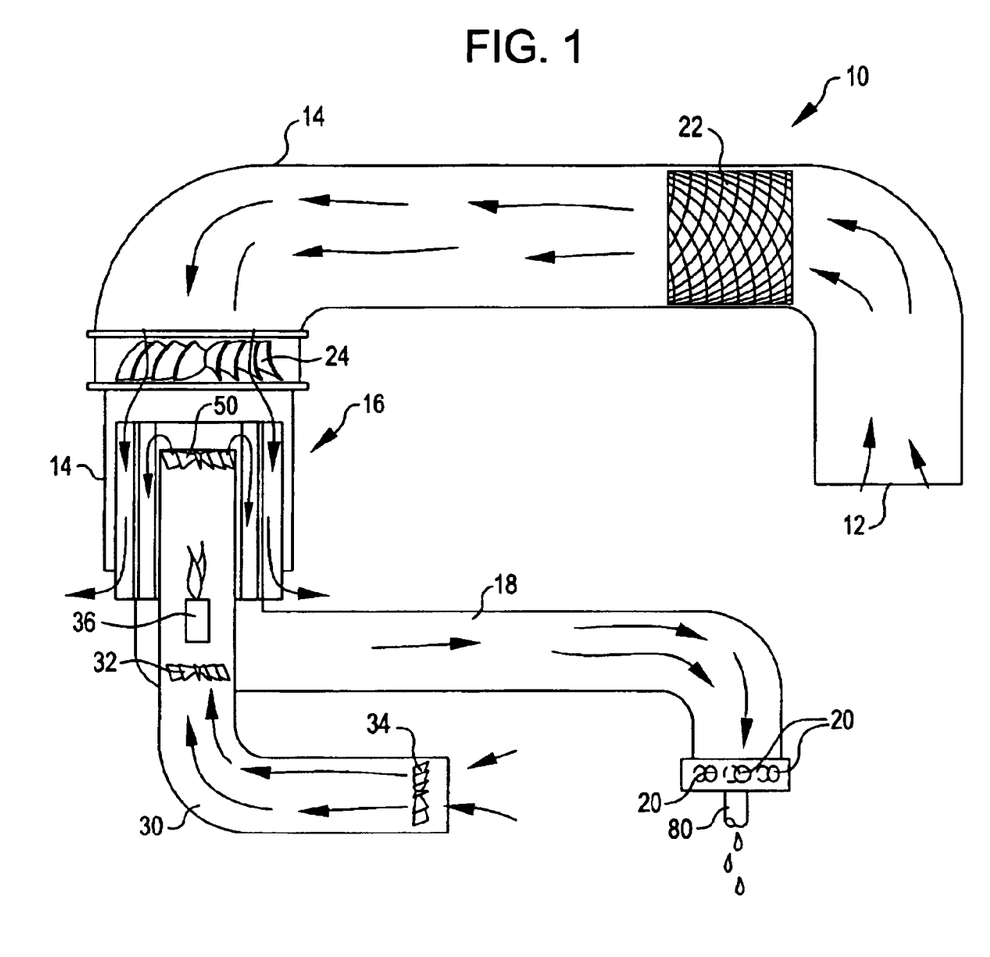
FIG. 1 is a schematic representation of an insect trap in accordance with the present invention.
Figure 2:
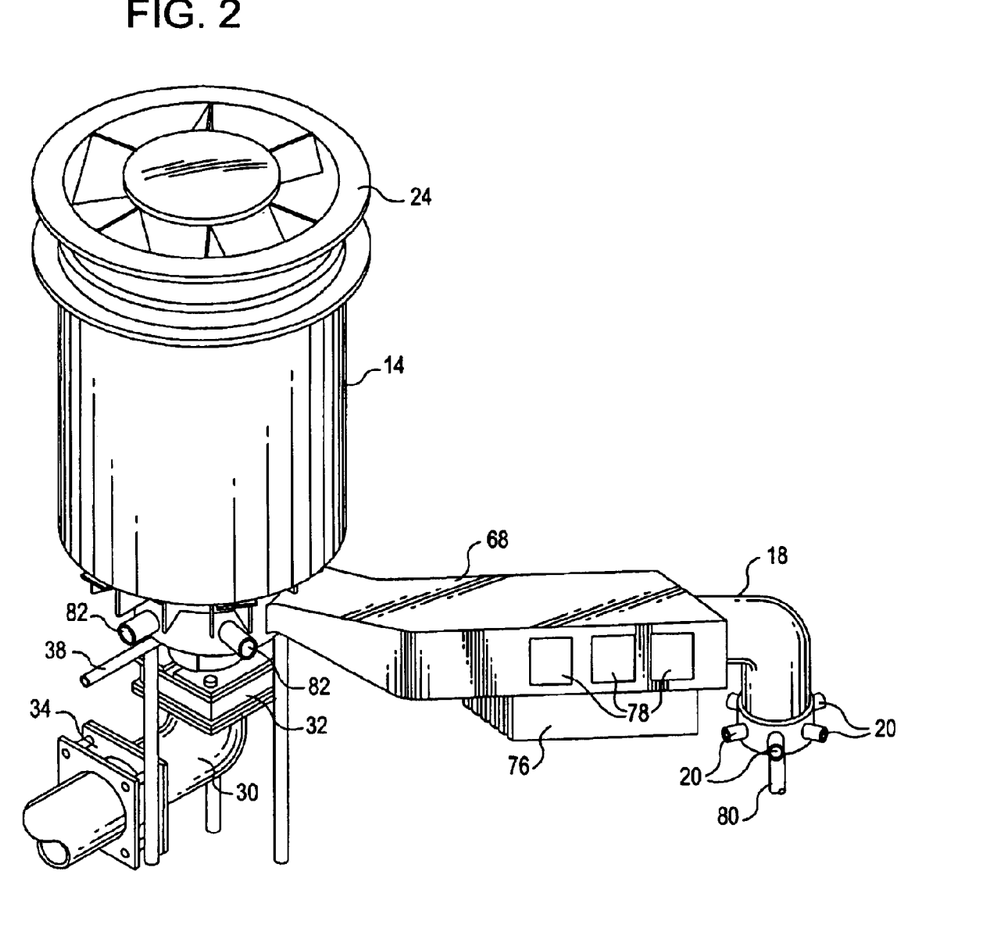
FIG. 2 is a side perspective view of a combustion gas cooling portion the insect trap of claim 1.

Turning now to the drawings, in which like reference numerals represent like parts throughout the several views, FIG. 1 shows a schematic diagram of an insect trap 10 incorporating the present invention. The insect trap 10 includes a trap inlet 12 at an end of a trap conduit 14. In accordance with one embodiment of the present invention, a combustion chamber 16 is mounted in the trap conduit 14, and is cooled by air flow through the trap conduit.

Briefly described, combustion occurs in the combustion chamber 16, and the combustion gasses from the combustion process are cooled by air flowing through the trap conduit 14. The cooled air flows from the combustion chamber 16 into a cooling chamber 18, and out of exhaust outlets 20. The cooling of the combustion chamber 16 by the air flowing the trap conduit 14, along with the cooling by the cooling chamber 18, causes the gasses exiting from the exhaust outlets 20 to be at or below ambient temperature.

The invention has particular use for producing cooled carbon dioxide gasses for use in a mosquito trap. To this end, the trap inlet 12 may serve as an inlet for receiving mosquitoes and other biting insects that are attracted by the exhaust plume exiting the exhaust outlets 20. Thus, in accordance with one aspect of the present invention, the exhaust outlets preferably route the cooled, combusted gasses adjacent to the trap inlet 12. Mosquitoes attracted to the plume are drawn into the trap inlet 12.

To capture mosquitoes and/or biting insects, the insect trap 10 may include a specimen bag 22 at some position along the length of the trap conduit 14 for catching insects as they are drawn through the trap conduit 14. To this end, a fan 24 or a similar device that is capable of drawing air through the trap conduit 14 is provided within, or is otherwise associated with, the trap conduit 14 so as to draw air through the trap conduit 14.

In one embodiment, the fan 24 may be capable of drawing, for example, 235 cubit feet per minute of air through the trap conduit 14. This significant draw of air into the trap inlet 12 is sufficient to draw mosquitoes and other biting insects into the trap conduit 14 when the insects approach the trap inlet 12.

In accordance with one aspect of the present invention, the combustion chamber 16 is mounted so that the combustion chamber, and gasses produced in the combustion chamber, are cooled by air flowing from the trap conduit 14. In the embodiment shown, the combustion chamber 16 is located in the trap conduit, but air may alternatively be routed into contact with combustion chamber, such as against the side of the combustion chamber, or through a portion of the combustion chamber. To this end, to the extent that the trap conduit 14 is discussed herein as routing air over, through, in contact with, or around the combustion chamber, the air flow may be any of these. Similarly, the trap conduit 14 may not be a single conduit, but instead may be any structure that directs at least some air from the trap inlet into contact with the combustion chamber.

Figure 4:
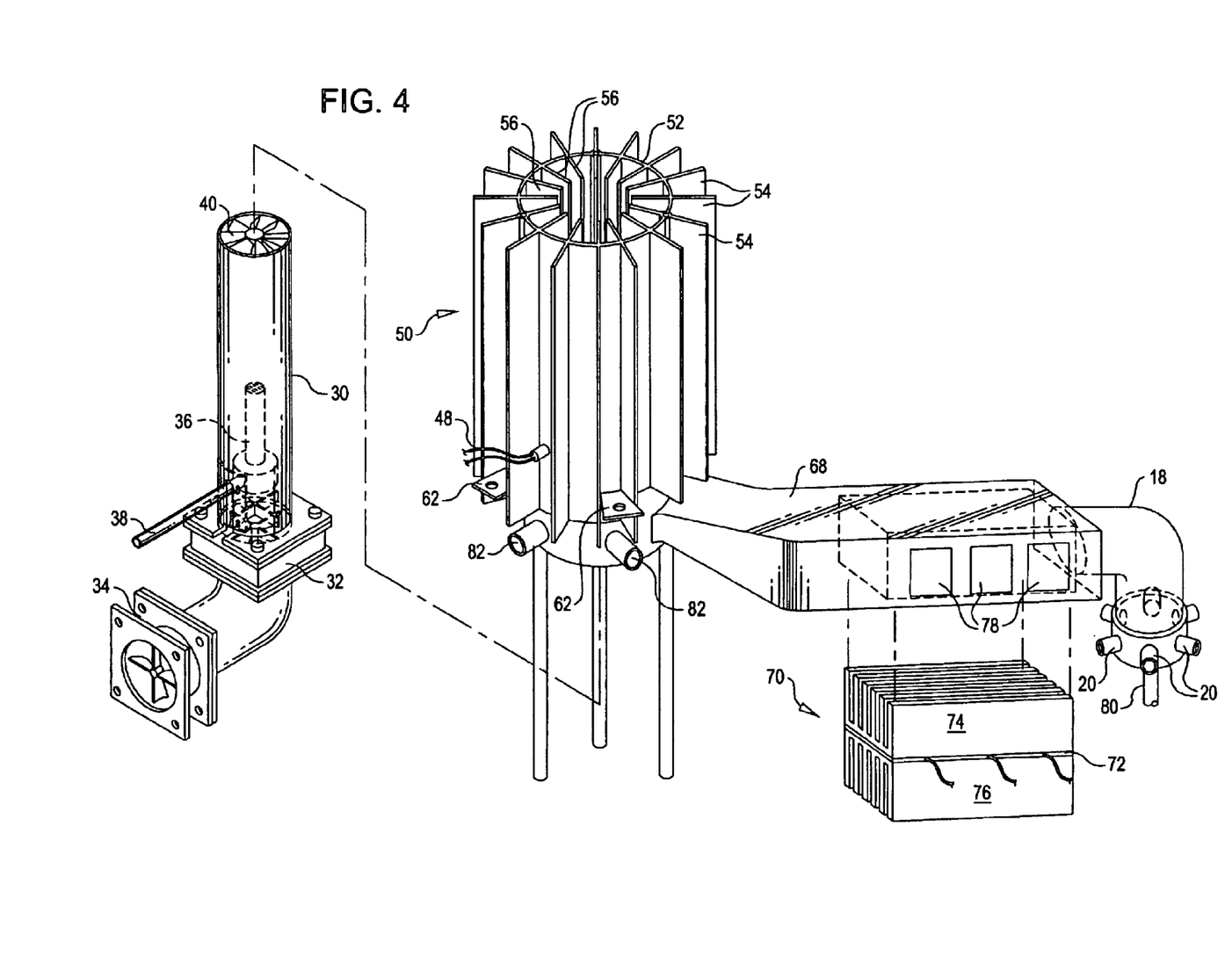
FIG. 4 is an exploded side perspective view showing the combustion gas cooling portion of FIG. 2, in a further state of disassembly, and with parts removed to show detail.

In the embodiment shown in the drawings, the combustion chamber 16 includes a burner tube 30. Details of the burner tube 30 are best shown in FIG. 4. The burner tube 30 includes a right angel bend at its lower end, with first and second fans 32, 34 at opposite ends of the right angle. The fans 32, 34 are both arranged so that they may draw air into the burner tube 30, and in one embodiment, each produces an air flow of seven to ten cubic feet per minute. As an alternative to the two fans shown, a single fan may be used to draw air into and through the burner tube 30.

A burner 36 is mounted centrally in the burner tube 30. Preferably, the burner is spaced from the inner side walls of the burner tube 30. The burner 36 includes a fuel inlet 38 leading to typical components for a burner assembly, for example, such as is used for camping stoves or camping lanterns. Because such components are well known, they are omitted from the drawings in order not to obscure the present invention. However, as an example, the fuel inlet 38 may be connected to a regulator (not shown) for lowering the pressure from a propane tank or other propane source. Although described with reference to a propane burner, the combustion chamber 16 may utilize other fuels for combustion, including, but not limited to, kerosene, gasoline, and other liquid, solid, or gaseous fuels.

An electrode 48 (FIG. 4) may be included for starting a flame in the burner 36 in a method known in the camp stove art. Alternatively, manual lighting of the burner 36 may be implemented, but such a system is not as convenient as a burner including an automatic starter such as the electrode 48.

In the embodiment shown in the drawings, the fans 32, 34 draw air through the bottom of the burner tube 30 into contact with the bottom of the burner 36 and around the burner 36 to bypass the burner 36. Air entering the burner 36 is used in the combustion process. Air flowing around the burner 36 is not combusted. Preferably, in accordance with one aspect of the present invention, a structure is provided within the burner tube 30 or closely associated therewith that mixes the combusted gasses from the burner 36 with the air flowing around the burner 36. In the embodiment shown in the drawings, this mixing is provided by a circular pattern of fixed fan blades 40 (FIG. 4) positioned across the top of the burner tube 30. However, if desired, other structures may be used.

A cylindrical heat exchanger 50 is mounted on the outside of the burner tube 30. The cylindrical heat exchanger 50 is preferably formed of a thermally conductive material. In the embodiment shown in the drawings, the cylindrical heat exchanger 50 includes a central cylinder 52 having outer fins 54 extending outwardly therefrom. Inner fins 56 extend inward from the central cylinder 52 and are spaced from one another so as to form a void. The void is sized and arranged so as to receive the burner tube 30. The burner tube 30 preferably fits within the void so that the top of the burner tube 30 is spaced from the top of the cylindrical heat exchanger 50, the function of which is described below. If desired, the burner tube 30 may alternatively be integrally formed with the heat exchanger 50.

In the embodiment shown in the drawings, a series of bosses 58 are located around the top edge of the central cylinder 52. The bosses are for receiving fasteners 59 for the attachment of a top plate 60. The top plate 60 encloses the top portion of the central cylinder 52, and with the central cylinder defines a central chamber in the heat exchanger. The central chamber may be arranged in alternate ways. Although shown as a cylinder with a flat top in the drawings, the central chamber may take any shape and may be formed from one or more pieces. The top portion of the burner tube 30 is located within the central chamber. Although shown as being attached by the fasteners 59, the top plate 60 may be one piece with the cylindrical heat exchanger 50, or may be attached in another suitable manner, such as welding.

A series of flanges 62 extend outward from a bottom portion of the cylindrical heat exchanger 50. As can be seen in FIG. 4, the electrode 48 may extend out of the side of the cylindrical heat exchanger 50.

Figure 3:
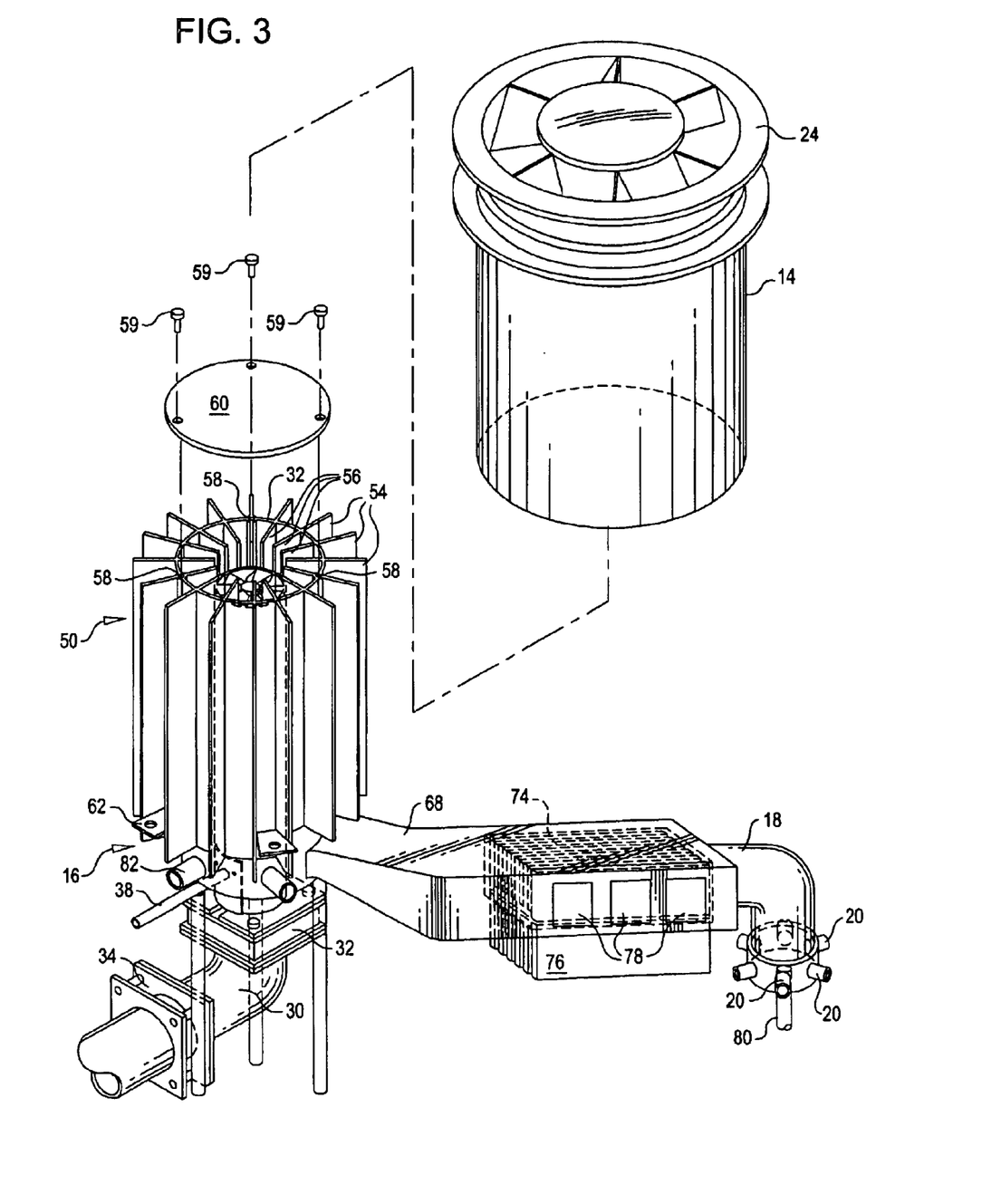
FIG. 3 is an exploded side perspective view showing the combustion gas cooling portion of FIG. 2.

As shown in FIGS. 3 and 4, to assemble the combustion chamber 16, the burner tube 30 is inserted upward into the void between the inner flanges 56 of the cylindrical heat exchanger 50. The cylindrical heat exchanger 50 is then inserted into the trap conduit 14. Preferably, each of these pieces fits tightly into the next, so that the outer edges of the outer fins 54 of the heat exchanger 50 engage the inner walls of the trap conduit 14, and the burner tube 30 abuts the inner edge of each of the inner fins 56. In the shown embodiment, the trap conduit 14 is split into two different pieces, with the fan 24 being situated between the two pieces. If desired, the trap conduit 14 may be formed as a single piece, or as multiple pieces, or may be any structure that provides fluid communication between the trap inlet 12 and the combustion chamber 16.

When the cylindrical heat exchanger 50 is inserted into the trap conduit 14, the bottom edge of the trap conduit 14 rests against the flanges 62. Thus, the bottom portion of the cylindrical heat exchanger 50 extends out of the bottom of the trap conduit 14.

As can best be seen in FIG. 1, the cooling chamber 18 is connected to the bottom of the cylindrical heat exchanger 50 and is in fluid communication with the central chamber of the cylindrical heat exchanger 50. Thus, the cooling chamber 18 is in fluid communication with the inside of the burner tube 30. The cooling chamber 18 includes a manifold 68 that extends from the cylindrical heat exchanger 50 to the exhaust outlets 20.

A cooling device is located within the cooling chamber 18. In the shown embodiment, the cooling device is a thermoelectric device 70. However, the cooling device may alternatively be any device that is capable of removing heat from the cooling chamber 18, such as a Stirling cooler, a refrigeration unit, or other structures designed to remove heat.

For the thermoelectric device 70, one or more thermoelectric coolers 72 (FIG. 4, well known in the industry) are mounted between a cold side sink 74 and a hot side sink 76. As can be seen in FIG. 3, the cold side sink 74 is mounted inside the cooling chamber 18, and the hot side sink 76 extends outside of the cooling chamber 18. A number of power ports 78 are included on the side of the manifold 68 for attaching a power supply (not shown) to the thermoelectric coolers 72.

For the embodiment shown in the drawings, six exhaust outlets 20 are included on the end of the manifold 68. Any number of exhaust outlets may be used, and exhaust from the exhaust outlets 20 is preferably routed adjacent to the trap inlet 12. This routing is not shown in the drawings, but may be provided by appropriate conduits. By routing the cooled exhaust gases adjacent to the trap inlet 12, mosquitoes and other biting insects may be attracted by the exhaust, and may be sucked into the trap inlet 12. A drip tube 80 is included on the bottom of the manifold 68 for allowing condensation from the exhaust to drip out of the manifold 68.

In operation, the fans 24, 34 and 32 are turned on, and the gas supplied to the burner 36 via the fuel inlet 38. The electrode 48 is sparked, causing a flame to burn in the burner 36. Air may be drawn into the burner tube 30 via air inlets 82, or the air may be supplied solely from the fans 32 and 34. In addition, if desired, octenol or another insect attractant may be introduced into the burner tube 30 and mixed with the combustion gases.

Combustion by the burner 36 creates carbon dioxide, which flows upward through the burner tube 30. The air flow from the fans 32, 34 flows around the burner 36 and the combusted gasses of the burner. Because this air stream is under some pressure, and the combustion gasses are initially at high heat and tend to rise, there is little mixing of the air flowing around the burner and the combustion gases until the air flow and the combusted gasses reach the fan blades 40. These fan blades cause turbulence in the air flow, and mix the combusted gasses with the air flow from the fans 32, 34. The air flow then reaches the top plate 60 and is forced down between the inner fins 56 and out into the manifold 68.

Air flowing through the trap conduit 14 enters the trap inlet 12 and flows through the specimen bag 22 and through the fan 24. From there, the air has only one place to travel, and that is downward through the outer fins 54. This air flow causes a cooling of the outer fins 54. This cooling effect is transferred to the rest of the cylindrical heat exchanger 50, because, as stated above, the cylindrical heat exchanger 50 is preferably formed of a thermally conductive material. The cooling by the air is transmitted to the burning tube 30 via the inner fins 56. To this end, the inner fins 56 may be configured (e.g., chamfered) as desired so as to maximize heat removal from the central chamber and the burner tube.

Thus, the air flow through the trap conduit 14 cools the combusted air leaving the burner tube 30 and flowing to the manifold 68. In one embodiment, this cooling effect, along with the cooling of the combusted gasses by the dilution with the air flowing from the fans 32, 34, causes air entering the manifold 68 to be approximately twenty degrees Fahrenheit (F) above ambient.

The cooling device (e.g., the thermoelectric device 70), further cools the combusted gasses before they reach the exhaust outlets 20. In the shown embodiment, the combusted gasses are cooled to slightly below ambient. This temperature of carbon dioxide has been found to be beneficial in attracting biting insects and mosquitoes.

The concepts of the invention may be used as shown in the drawings, or the cooling chamber 18 and the cylindrical heat exchanger 50 may be used without the other. For example, the burner tube 30 and the cylindrical heat exchanger 50 may be used with the trap conduit 14, without the use of the cooling chamber 18, so as to provide cooled carbon dioxide for a mosquito and biting insect trap. In addition, combustion gasses may be routed through a cooling chamber, such as the cooling chamber 18, and may be cooled by the cooling device (e.g., the thermoelectric device 70), without being first cooled by the air flowing through the trap conduit 14. However, the combination of the devices works particularly well in providing cooled combustion gasses with an apparatus of very little cost.

The present invention is particularly useful in that it generates carbon dioxide through a combustion process, which is a relatively inexpensive and virtually maintenance free manner of producing the carbon dioxide. In addition, the present invention utilizes an existing air flow—the flow through the trap conduit 14—to cool that carbon dioxide to a temperature where it is useful for attracting mosquitoes and other biting insects.

The cooling device (e.g., the thermoelectric device 70) is useful in that it may be used to closely set an exhaust temperature for the combustion gases. If desired, the cooling device may be used in conjunction with a temperature sensor so that exhaust temperatures may be more precisely controlled.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. An insect trap comprising:
   a conduit for the entry of insects, and including a trap entry;
   a fan for drawing air through the conduit;
   a combustion chamber having an outlet in fluid communication with an attractant outlet, the combustion chamber being arranged and configured so air drawn through the conduit by the fan cools the combustion chamber; and
   a cooling device mounted between the combustion chamber and the attractant outlet, the cooling device including at least a portion below ambient temperature.

2. The insect trap of claim 1, further comprising a heat exchanger mounted on the combustion chamber and arranged to contact the air drawn by the fan.

3. The insect trap of claim 2, wherein the heat exchanger comprises a central chamber and outer fins extending from the central chamber, the outer fins being in contact with air flowing through the trap inlet via the fan.

4. An insect trap comprising:
   a conduit for the entry of insects, and including a trap entry;
   a fan for drawing air through the conduit;
   a combustion chamber having an outlet in fluid communication with an attractant outlet, the combustion chamber being arranged and configured so air drawn through the conduit by the fan cools the combustion chamber;
   a heat exchanger mounted on the combustion chamber and arranged to contact the air drawn by the fan, the heat exchanger comprising a central chamber and outer fins extending from the central chamber, the outer fins being in contact with air flowing through the trap inlet via the fan; and
   a combustion tube mounted at least partly within the heat exchanger and inside the central chamber.

5. The insect trap of claim 4, wherein the heat exchanger further comprises inner fins extending inward from the central chamber and abutting the combustion tube.

6. The insect trap of claim 4, further comprising a fan in the combustion tube for directing air into the central chamber.

7. The insect trap of claim 6, further comprising a structure for mixing air from the fan with combusted gasses formed within the combustion tube.

8. The insect trap of claim 7, wherein the cooling device is configured to cool exhaust gasses to below ambient temperature.

9. An insect trap comprising:
   a conduit for the entry of insects, and including a trap entry;
   a fan for drawing air through the conduit;
   a combustion chamber having an outlet in fluid communication with an attractant outlet, the combustion chamber being arranged and configured so air drawn through the conduit by the fan cools the combustion chamber; and
   a thermoelectric device mounted between the outlet of the combustion chamber and the attractant outlet, the thermoelectric device being configured to cool exhaust gasses from the combustion chamber.

10. The insect trap of claim 9, wherein the thermoelectric device comprises a hot sink and a cold sink, and wherein the cold sink is arranged to contact the exhaust gases.

11. The insect trap of claim 1, wherein the combustion chamber is mounted at least partly within the conduit.

12. The insect trap of claim 11, further comprising a heat exchanger mounted between the combustion chamber and the conduit, the heat exchanger being arranged to contact the air drawn by the fan.

13. The insect trap of claim 12, wherein the heat exchanger comprises a central cylinder defining a central chamber and outer fins extending from the central cylinder, the outer fins being in contact with air flowing through the trap inlet via the fan, and being in contact with an interior wall of the conduit.

14. The insect trap of claim 13, further comprising a combustion tube mounted at least partly within the heat exchanger and inside the central chamber.

15. The insect trap of claim 14, wherein the heat exchanger further comprises inner fins extending inward from the central chamber and abutting the combustion tube.

16. The insect trap of claim 14, further comprising a fan in the combustion tube for directing air into the central chamber.

17. The insect trap of claim 16, further comprising a structure for mixing air from the fan with combusted gasses formed within the combustion tube.

18. An insect trap comprising:
- a combustion chamber for producing carbon dioxide and having an outlet in fluid communication with an attractant outlet; and
- a cooling device mounted between the outlet of the combustion chamber and the attractant outlet, the cooling device being configured to cool exhaust gasses from the combustion chamber to below ambient temperature.

19. An insect trap comprising:
- a combustion chamber for producing carbon dioxide and having an outlet in fluid communication with an attractant outlet; and
- a thermoelectric device mounted between the outlet of the combustion chamber and the attractant outlet, the thermoelectric device being configured to cool exhaust gasses from the combustion chamber.

20. The insect trap of claim 19, wherein the thermoelectric device comprises a hot sink and a cold sink, and wherein the cold sink is arranged to contact the exhaust gases.

* * * * *